STEP I — PARTIALLY, BUT INCOMPLETELY, EXPAND A PARTICULATE FOAMABLE THERMOPLASTIC STYRENE POLYMER.

STEP II — IMMEDIATELY SUBJECT THE PARTIALLY EXPANDED THERMOPLASTIC STYRENE POLYMER PARTICLES FROM STEP I TO A GASEOUS PRESSURE WHICH PRESSURE IS INSUFFICIENT TO COLLAPSE THE PARTIALLY EXPANDED PARTICLES AND AT A TEMPERATURE BELOW THE SOFTENING POINT OF THE PARTICLES.

STEP III — IMMEDIATELY MOLD, IN A CLOSED MOLD, THE PARTIALLY EXPANDED PARTICLES FROM STEP II BY HEATING TO A TEMPERATURE ABOVE THE SOFTENING POINT OF THE THERMOPLASTIC STYRENE POLYMER.

STEP IV — REMOVE THE FOAMED MOLDED ARTICLE FROM THE MOLD.

SAMUEL BAXTER
WILLIAM B. BROWN
INVENTORS.

BY William F. Mufatti
ATTORNEY.

3,328,497
METHOD OF TREATING AND MOLDING EXPANDABLE POLYSTYRENE PARTICLES
Samuel Baxter, Flackwell Heath, and William Bernard Brown, Hillingdon, England, assignors to Monsanto Chemicals Limited, London, England, a British company
Filed Jan. 9, 1962, Ser. No. 165,240
Claims priority, application Great Britain, Aug. 26, 1960, 29,517/60
8 Claims. (Cl. 264—53)

This is a continuation-in-part of copending application S.N. 132,002; filed Aug. 17, 1961, now abandoned.

This invention relates to an improved process for preparing a foamed thermoplastic styrene polymer.

Foamed styrene polymers are finding wider applications in both the industrial and consumer fields and are generally prepared either by the molding or by the extruding of a particulate foamable styrene polymer composition. In the molding process for preparing such foamed polymers, it is often desirable to partially expand the foamoble styrene particles, place the desired quantity of said particles into a mold, complete the expansion of the partially expanded particles by the addition of heat and extract the molded foamed article therefrom. Sometimes a large block of a foamed styrene polymer is molded in this manner and subsequently subdivided into sheets.

However, one of the drawbacks encountered in the above-described molding operation is the necessity of conditioning the partially expanded foamable thermoplastic polymer particles for a period of time by exposure to the atmosphere before final expansion and molding thereof. Further, if the molded product is a block which is to be subsequently subdivided into sheets, it is also necessary to condition the foamed molded block before subdivision thereof in order to prevent deformation or warping of the molded foamed block during cutting. Such an operation is extremely time-consuming sometimes requiring a complete time cycle of as much as 36 hours when considering conditioning and molding time. Economically, such a time cycle is extremely costly and it therefore would be of great economic importance to the industry to greatly reduce such a time cycle.

Therefore, it is an object of this invention to provide an improved process for preparing a molded foamed thermoplastic styrene polymer from a particulate foamable thermoplastic styrene polymer.

Another object of this invention is to prepare foamed thermoplastic styrene polymer sheets by immediately subdividing a block prepared by said improved process.

Briefly, according to this invention, the above and other objects of this invention are attained by partially, but incompletely, expanding thermoplastic styrene polymer particles, subjecting the particles to a gaseous pressure immediately after partial expansion thereof and immediately thereafter molding the particles by further expansion thereof in a closed mold through the addition of heat. Such a molded article after cooling can be immediately subdivided into sheets if desired. No conditioning time is required.

The following examples are set forth to illustrate more clearly the principle and practice of this invention to one skilled in the art. Unless indicated otherwise, all percentages and parts are on a weight basis.

*Example I*

Approximately 1.5 liters of partially expanded foamable polystyrene particle, having about 7% n-pentane incorporated therewith, are placed in a 2 liter pressure vessel immediately after partial expansion thereof to a bulk density of about 1 pound per cubic foot. The vessel has connections to a compressed air supply and a pressure gauge. The vessel is sealed and the air pressure inside the vessel is increased gradually over a period of 5 minutes to about 10 pounds per square inch (gauge). The pressure is held at this figure for about 55 minutes. The operation is carried out at room temperature. The pressure is then released, the vessel is opened and the particles are immediately transferred to a mold having the dimensions of 8 inches x 8 inches x 1½ inches. The mold is closed and heated by the injection of steam at a temperature of about 220° F. through perforations in the base plate of the mold until these perforations are sealed off by the expansion of the partially expanded particles. The mold is then cooled and the molded block of foamed polystyrene is removed. By means of a heated wire, the block is immediately cut into three sheets, each of which are 8 inches x 8 inches x ½ inch. These sheets have no tendency to warp on standing and have a density of about 1 pound per cubic foot. The process as described above takes 1 hour and 10 minutes.

To obtain foamed polystyrene sheets of the same thickness with equally satisfactory characteristics by a conventional process requires the use of partially expanded particles which have been conditioned by standing in the atmosphere for about 24 hours after partial expansion thereof. It is also preferable to condition the molded block for a further 8 hours before cutting into the ½ inch sheets.

*Example II*

Example I is repeated except that the gas employed to pressurize the partially expanded foamable polystyrene particles is respectively carbon dioxide, nitrogen and argon. In each case, comparable results are obtained.

The present invention is directed to a process for preparing a foamed thermoplastic styrene polymer which process comprises (a) partially, but incompletely, expanding a particulate foamable thermoplastic styrene polymer, (b) immediately thereafter subjecting the particulate partially expanded thermoplastic styrene polymer to a gaseous pressure insufficient to collapse the partially expanded thermoplastic styrene polymer particles, and (c) immediately thereafter molding the said partially expanded particles by further expansion thereof in a closed mold and at a temperature above the softening point of the thermoplastic styrene polymer. The foamable thermoplastic styrene polymer particles have incorporated therein a volatile organic foaming agent.

The gas employed in the practice of this invention for pressurizing the partially expanded thermoplastic styrene polymer particles can be any gas which is substantially inert when in contact with the said polymer particles employed herein. Typical examples of such a gas are air, carbon dioxide, nitrogen, argon and mixtures thereof.

The pressure employed in treating the partially expanded thermoplastic polymer particles may be any gaseous pressure which is insufficient to cause the partially expanded polymer particles to collapse. It is preferred, in the practice of this invention, to employ pressures ranging from about 3 to about 25 p.s.i. gauge and more particularly pressures of about 5 to about 15 p.s.i. gauge.

The temperature at which the partially expanded polymer particles are pressurized can vary over a fairly wide range providing the temperature is below the softening temperature of the thermoplastic styrene polymer. The preferred range to be employed in the practice of this invention is from about 0° C. to about 60° C. and more particularly from about 15° C. to about 25° C.

The time period for which the partially expanded thermoplastic polymer particles are held under pressure generally depends upon the pressure and temperature employed. Satisfactory results have been obtained for example when the polymer particles have been subjected to a pressure of about 10 p.s.i. gauge at about 25° C. for a period of from about 30 minutes to about 180 minutes. Shorter or longer periods can be effective depending upon the variables employed herein as stated previously.

The thermoplastic styrene polymers, which may be employed in the practice of this invention, are the homopolymers and the interpolymers of styrene. The interpolymers of styrene should contain at least 50 weight percent and preferably 75 weight percent of styrene with the balance being up to 50 weight percent and preferably up to 25 weight percent of any monomeric compound which will interpolymerize with styrene, particularly those monomeric compounds having the vinylidene group $CH_2=C<$. These monomeric materials include such compounds as olefins and diolefins, e.g., ethylene, propylene, isobutylene, butadiene, isoprene; unsaturated carboxylic acids and derivatives thereof, e.g., acrylic acid, methacrylic acid, acrylamide, methacrylamide, methacrylonitrile, acrylonitrile, acrylic acid and methacrylic acid esters of alcohols containing 1–18 carbon atoms such as methyl and ethyl methacrylate; other vinylidene aromatic compounds, e.g., alpha-methylstyrene, vinyl toluene, p-ethylstyrene, 2,4-dimethylstyrene, o-chlorostyrene, 2,5-dichlorostyrene, vinyl naphthalene; etc. Other monomers which can be interpolymerized with styrene for the purposes of the present invention include alpha,beta-unsaturated polycarboxylic acids and derivatives thereof, e.g., maleic anhydride, diethyl maleate, dibutyl fumarate, etc. It may be feasible and desirable to employ blends of two or more such thermoplastic styrene polymers. The preferred thermoplastic styrene polymers to be employed in the practice of this invention are the homopolymers of styrene.

The foaming agent employed in the practice of this invention is a volatile non-reactive organic compound having an atmospheric boiling point of less than about 80° C. with the preferred boiling point being in the range of about −10° C. to about 80° C. and having, at most, a slight solvent action on the thermoplastic styrene polymer employed in the practice of this invention. Examples of volatile nonreactive organic compounds which can be employed as a foaming agent are the aliphatic hydrocarbons such as propane, butane, isobutane, pentane, hexane, isohexane, cyclohexane, etc.; certain halogenated aliphatic hydrocarbons such as ethyl chloride, propyl chloride, butyl chloride, isopropyl bromide and particularly the perchlorofluorocarbons such as dichlorodifluoromethane, monochlorotrifluoromethane, trichloromonofluoromethane, 1,1,2,2 - tetrachloro - 1,2 - difluoroethane, and the corresponding perchlorofluorocarbons as set forth in U.S. 2,848,428; aliphatic amines such as ethylamine, propylamine, isopropylamine, butylamine, dimethylamine, diethylamine, etc.; aliphatic ethers such as diethyl ether, diisopropyl ether, methyl ethyl ether, ethyl isopropyl ether, etc.; acetaldehyde, etc. For a listing of other volatile organic foaming agents that can be employed see U.S. 2,681,321. The preferred foaming agent employed in the practice of this invention is n-pentane.

It is feasible and in some cases desirable to employ mixtures as the volatile organic foaming agent wherein the mixtures consist predominantly of a volatile non-reactive organic foaming agent of the type described above with minor amounts of an organic compound having a solvent action on the thermoplastic styrene polymers included in the composition of this invention. Typically, such mixtures will contain 70–99% by weight of the volatile non-reactive organic foaming agent and, correspondingly, 30–1% by weight of the organic compound having a solvent action on the thermoplastic styrene polymers. Typical of the organic compounds having such a solvent action and which can be employed in admixture with a volatile non-reactive organic foaming agent are acetone, methylene chloride, styrene monomer, benzene, xylene, carbon tetrachloride, chloroform, etc. Preferably, the organic solvent should have a boiling point not higher than about 80° C.

It will thus be seen that the objects set forth above, among those made apparent from the preceding description, are efficiently attained, and since certain changes may be made in carrying out the above process and in the composition set forth without departing from the scope of this invention, it is intended that all matters contained in the above description shall be interpreted as illustrative and not in a limiting sense.

What is claimed is:

1. A method of treating and molding expandable styrene polymer particles which have incorporated therein as an expanding agent an organic compound that has a boiling point below the softening point of the styrene polymer which comprises: partially, but incompletely, expanding the particles, immediately subjecting the so expanded particles to contact with a substantially inert gas at a superatmospheric pressure insufficient to collapse the expanded particles, and at a temperature below the softening point of these particles; and thereafter immediately molding in a closed mold said expanded and treated particles at a temperature above the softening point of the particles.

2. A process for preparing a foamed thermoplastic styrene polymer which process comprises (a) partially, but incompletely, expanding a particulate foamable thermoplastic styrene polymer, (b) immediately subjecting the particulate partially expanded thermoplastic styrene polymer to a gaseous pressure insufficient to collapse the particulate partially expanded thermoplastic styrene polymer and at a temperature below the softening point of the thermoplastic styrene polymer, and (c) immediately molding by further expansion of the particulate partially expanded thermoplastic styrene polymer in a closed mold and at a temperature above the softening point of the thermoplastic styrene polymer; said thermoplastic styrene polymer being selected from the group consisting of styrene homopolymers and interpolymers wherein the interpolymers consist of at least 50 weight percent of styrene; said particulate foamable thermoplastic styrene polymer having incorporated therein a volatile organic foaming agent having an atmospheric boiling point of less than about 80° C.

3. A process for preparing a foamed thermoplastic styrene polymer which process comprises (a) partially, but incompletely, expanding a particulate foamable thermoplastic styrene polymer, (b) subjecting the particulate partially expanded thermoplastic styrene polymer to a gaseous pressure of about 3–25 p.s.i. gauge for a period of about 30–180 minutes and at a temperature ranging from about 0° C. to about 60° C., and (c) immediately molding by further expansion of the particulate partially expanded thermoplastic styrene polymer in a closed mold and at a temperature above the softening point of the thermoplastic styrene polymer; said thermoplastic styrene polymer being selected from the group consisting of styrene homopolymers and interpolymers wherein the interpolymers consist of at least 50 weight percent of styrene; said particulate foamable thermoplastic styrene polymer having incorporated therein a volatile organic foaming agent having an atmospheric boiling point of less than about 80° C.

4. A process as described in claim 2 wherein the gaseous pressure is 5–15 p.s.i. gauge.

5. A process as described in claim 2 wherein the gas is air.

6. A process as described in claim 2 wherein the gas is nitrogen.

7. A process as described in claim 2 wherein the thermoplastic styrene polymer is a homopolymer of styrene.

8. A process as described in claim 2 wherein the volatile organic foaming agent is n-pentane.

References Cited

UNITED STATES PATENTS

| 2,787,809 | 4/1957 | Stastny. |
| 2,986,537 | 5/1961 | Chaumeton. |
| 2,998,396 | 8/1961 | Nickolls _____ 260—2.5 |
| 3,013,996 | 12/1961 | Pollard et al. |

ALEXANDER H. BRODMERKEL, *Primary Examiner.*

MORRIS LIEBMAN, *Examiner.*

P. E. ANDERSON, *Assistant Examiner.*